United States Patent [19]
Edwards et al.

[11] Patent Number: 6,011,920
[45] Date of Patent: Jan. 4, 2000

[54] METHOD AND APPARATUS FOR DEBUGGING APPLICATIONS ON A PERSONALITY NEUTRAL DEBUGGER

[75] Inventors: Jonathan William Edwards; David Howard Evans; John Walter Mehl, all of Lexington, Ky.; James Michael Phelan, Austin, Tex.; Jeffrey Kennedy Wheatley, Lexington, Ky.

[73] Assignee: International Business Machines Corporation, Armonk, N.Y.

[21] Appl. No.: 08/901,831

[22] Filed: Jul. 28, 1997

Related U.S. Application Data

[63] Continuation of application No. 08/416,658, Apr. 5, 1995, abandoned.

[51] Int. Cl.$^7$ .................................................. G06R 9/445
[52] U.S. Cl. ............................................................ 395/704
[58] Field of Search ................................. 395/704, 701

[56] References Cited

U.S. PATENT DOCUMENTS

| | | | |
|---|---|---|---|
| 5,179,702 | 1/1993 | Spix et al. | |
| 5,249,270 | 9/1993 | Stewart et al. | 395/200 |
| 5,291,479 | 3/1994 | Vaziri et al. | |
| 5,371,746 | 12/1994 | Yamashita et al. | 371/19 |
| 5,533,192 | 7/1996 | Hawley et al. | 395/183.04 |
| 5,675,795 | 10/1997 | Rawson, III et al. | 713/2 |
| 5,842,226 | 11/1998 | Barton et al. | 711/203 |

OTHER PUBLICATIONS

Timmerman et al, "The design of D.A.R.T.S.: A dynamic dubugger for multiprocessor real–time applications", IEEE Transactions on Nuclear Science, Apr. 1992, vol. 39, Iss. 2. pp. 121–129.

Caerts et al, "PDG: a Portable Process–level Debugger for CSP–style Parallel Programs", IEEE System Sciences, 1994 Annual Hawaii Int'l. Conference, vol. II, May 1994, pp. 634–643.

Source: Computergram International, (Oct. 24, 1994) No. 2528, Title: Chorus systems adds remote development, device support to microkernel, tests cool interfaces.

Source: Edge Work Group Computing Report, (May 4, 1992) vol. 3, No. 102, Title: Mach 3.0 Microkernel: Development system for intel 80386 computers.

*Primary Examiner*—Tariq R. Hafiz
*Assistant Examiner*—Chameli C. Das
*Attorney, Agent, or Firm*—David A. Mims Jr.

[57] ABSTRACT

A method and apparatus for debugging applications on a microkernel without invoking services provided by a particular personality. An application debugger is separated into three distinct pieces consisting of a user interface, debug engine, debug probe (instrumentation server). The user interface supports user inputs and debugger output in a language and platform-independent syntax. The debug engine supports semantics for specific language and target operating environments. The debug probe supports low-level query, access and update of the applications's state. The instrumentation server checks to see if a requested application is in its list of known application tasks. The instrumentation server sets an application into debug mode by either attaching to the application from a list of applications that it has constructed by polling the IBM Microkernel loaders or by having the application launched by a given IBM Microkernel loader. Because the instrumentation server has root authority, it is able to enquire and obtain the application's task control port and therefore manipulate the applications's state using standard microkernel system calls.

24 Claims, 6 Drawing Sheets

METHOD AND APPARATUS FOR DEBUGGING APPLICATIONS ON A PERSONALITY NEUTRAL DEBUGGER

This is a continuation of application Ser. No. 08/416,658 filed Apr. 5, 1995, now abandoned.

FIELD OF THE INVENTION

The present invention relates to data processing systems, and more particularly, to debugging application programs with a personality neutral debugger.

BACKGROUND OF THE INVENTION

Computer users are demanding flexible and sophisticated techniques in hardware and software implementations. Complex, scalable and distributed products are the requisite ingredients for success in the marketplace. Manufacturers are answering the call by providing extensible and pluggable components. Component-based frameworks that enable applications to be "smeared" across networks at both the client and server level are required to make application development and deployment more flexible and dynamic. End users require application debuggers that allow them to create and adapt software applications quickly and easily in accordance with their requirements. This must be done within an industry that is sourced with a disparate line of operating systems and hardware platforms. Conventional application debuggers operate by gaining control of the application and obtaining information about the application's state using interfaces that are peculiar to the personality. However, with the arrival of multiple different operating systems, application debuggers must operate under a new initiative which permits the operating system to be stripped of its personality. These personalities—which contain information on how to interact with the user and run applications specific to the operating system—will be offered on a pick and mix basis to users who can then run them on top of a generic base level of code. The base level of code consists of a microkernel setting underneath a layer of personality neutral services, which handles things like disk accesses. In distributed corporate environments, the microkernel technology allows different computing platforms running different operating systems to be connected. The microkernel runs underneath, enabling a virtual uniprocessor environment in which data servers work with any other machine.

Current operating system technology is moving toward increased use of microkernels. Microkernels implement most basic hardware specific functions in a small self-contained kernel. Operating system features or personalities are added as applications that use system services of the microkernel. In response to increasing demand for microkernel-aware debuggers, software designers are producing debuggers that provide seamless development environments that intuitively assure timely development and software compatibility. One such prior art debugger is SINGLESTEP marketed by Software Development Systems. The SINGLESTEP debugger offers a complete turn-key multitasking solution and tools environment. SINGLESTEP is an integrated package of program building, code generation, debugging and analysis tools that provide Windows functionality for a seamless development and debugging environment, full source-level simulation, fast access to all program objects, kernel awareness during debugging and integration with a C compiler. While offering a powerful solution for application debug, the SINGLESTEP solution is not capable of providing a personality neutral implementation of its microkernel and its services. The SINGLESTEP solution is capable of working only within the scope of a single personality.

It is desirable to have a personality neutral application debugger which is capable of gaining control of an application and obtaining information about the application's state without using interfaces that are peculiar to the personality.

SUMMARY OF THE INVENTION

This invention relates to a method and apparatus for debugging applications on a microkernel without invoking services provided by a particular personality. For the purpose of this invention, personality refers to an operating system such as IBM OS/2 2.X or IBM UNIX. The architecture for the application debugger is separated into three distinct pieces consisting of a user interface, debug engine and debug probe (instrumentation server). The user interface supports user inputs and debugger output in a language and platform-independent syntax. The debug engine supports the application debugger's semantics for specific language and target operating environments. The debug probe supports low-level query, access and update of the application's state. The instrumentation server acts as a debug probe for personality-neutral applications and is accessible by the debug engine. The instrumentation server is loaded during the microkernel boot phase and is granted root authority. The debug engine executes an IPC to the instrumentation server to ask that a given probe function be performed on an application being debugged. The instrumentation server checks to see if the application is in its list of known application tasks. The instrumentation server sets an application into debug mode by either attaching to the application from a list of applications that it has constructed by polling the IBM Microkernel loaders or by having the application launched by a given IBM Microkernel loader. The instrumentation server uses the IBM Microkernel root name server to enquire about existing loaders that can assist in the debug process, i.e., answer application list queries, launch an application, etc. Because the instrumentation server has root authority, it is able to enquire and obtain the application's task control port and therefore manipulate the application's state using standard microkernel system calls. The instrumentation server also requests and obtains the application's exception notification port. This allows the instrumentation server to notify the debug engine of other events such as, attaching or detaching from an application, suspension of debug operations against an application, setting and clearing breakpoints.

DETAILED DESCRIPTION OF THE EMBODIMENT

The invention provides a method and apparatus for debugging applications under a microkernel without invoking services provided by a particular operating system (i.e., personality). The debugger need not gain control of the application and obtain information about the application's state using interfaces that are peculiar to the personality as required in conventional debuggers. Instead, the debugger is capable of debugging personality-neutral applications under a microkernel by separating the debug architecture into four distinct pieces.

Figure 1:
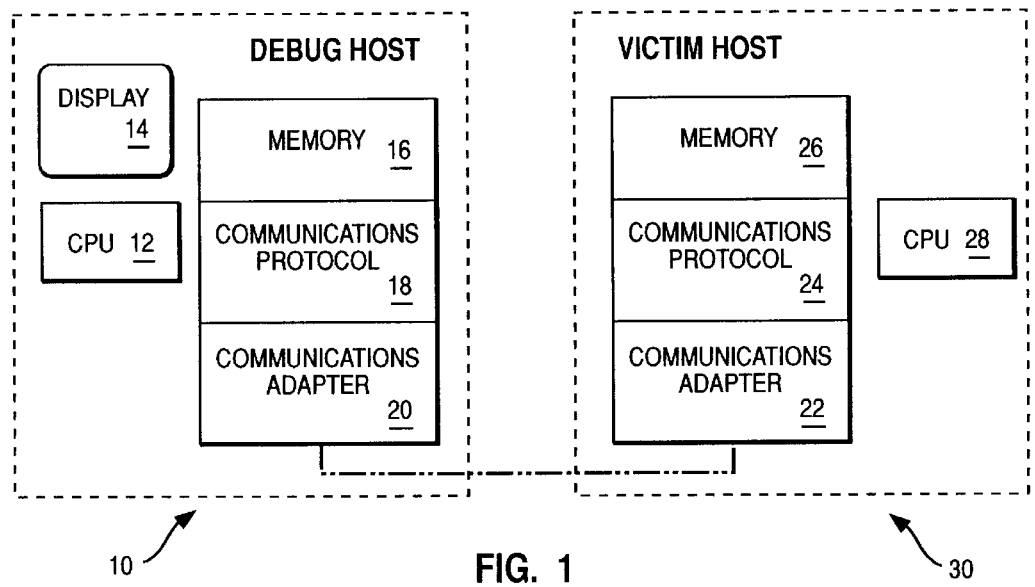
FIGS. 1 and 2 are block diagram representations of the functional blocks in machines where the invention is practiced.

Turning now to FIG. 1, there is shown a block diagram of a debug host 10 and victim host 30 where the invention is practiced. The debug host 10 contains a display 14 to allow a user to view events occurring on the debug host 10 and victim host 30. A CPU (Central Processing Unit) 12 controls memory 16 and a communication adapter 20 on the debug host 10. Communications protocol 18 allows the debug host 10 to communicate with the victim host 30 over any well-known network adapter such as token ring, ethernet or serial. Similarly, the victim host 30 contains a CPU 28 to control memory 26 and a communication adapter 22. Communications protocol 24 allows the victim host 30 to communicate over a network adapter with the debug host 10.

Figure 2:
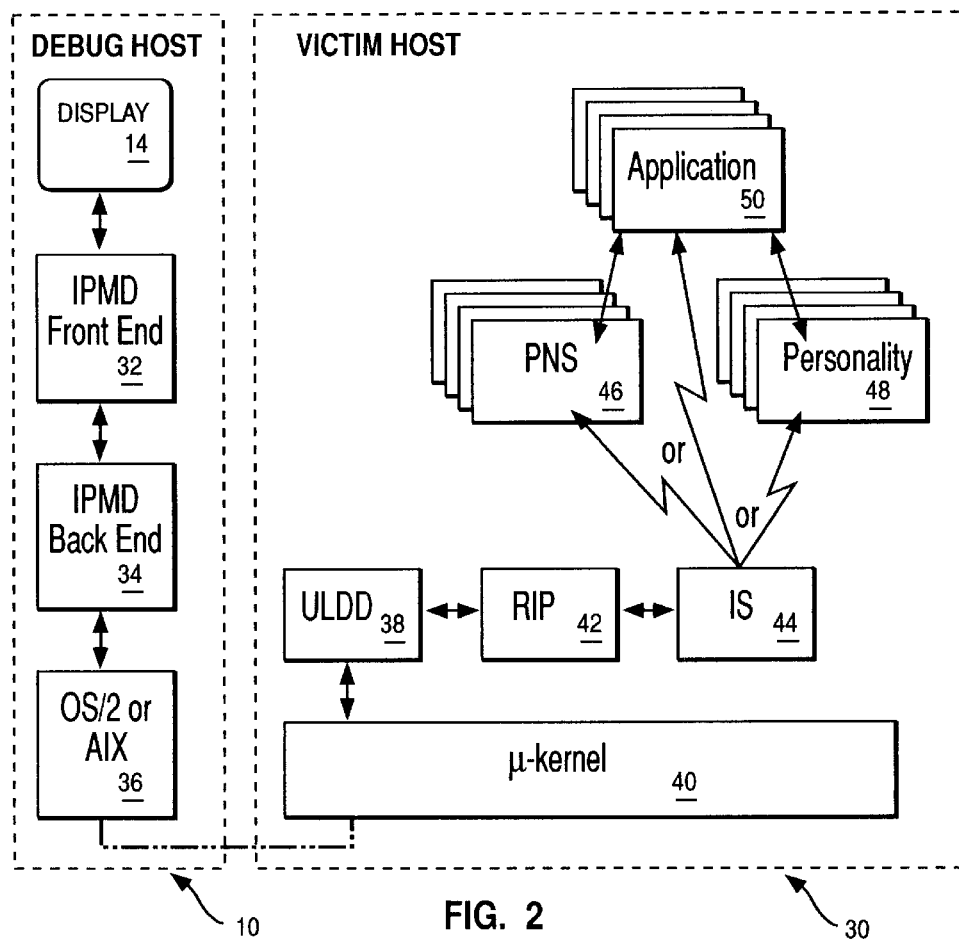

With reference to FIG. 2, additional detail is shown for components within the debug host 10 and debug victim 30. The application debugger is called a remote Interactive Presentation Manager Debugger (IPMD) and runs on the debug host 10. The operating system for the debug host 10 can be any well known operating system. In the preferred embodiments, OS/2 2.X (manufactured by the IBM Corporation) is used on an INTEL platform or AIX (Advanced Interactive Executive) is used on a RISC (Reduced Instruction Set Computer) platform (e.g., RS/6000 is a RISC processor based system manufactured by the IBM Corporation). The IPMD contains two components: 1). an IPMD front end 32 or user interface that drives the display 14, and 2). an IPMD back end 34 or debug engine that communicates with the target machine or victim host 30 via a network interface. The IPMD back end 34 is capable of communicating via three protocols and three network mediums. The simplest protocol is a basic pitch-catch protocol with a serial interface as the medium. The second communication protocol is Transmission Control Protocol (TCP) with a token ring or ethernet medium. The third communication protocol is User Datagram Protocol (UDP) with a token ring or ethernet medium. In any case, the communications adapter 22 (FIG. 1) on the debug host 30 is controlled by the debug host 30 native device drivers.

The basic flow is for an operator/user to enter debug commands via a graphical user interface (GUI) via the display 14 on the debug host 10 of IPMD front end 32. These commands are translated by the IPMD front end 32 to basic debug commands. The IPMD back end 34 creates command packets and sends them to the communications adapter 20 (FIG. 1) on the debug host 10 where they are electronically transmitted to the communications adapter 22 (FIG. 1) of the victim host 30. The victim host 30 in the preferred embodiment is an IBM PowerPC running the OS/2 WARP for PowerPC Microkernel and personality-neutral servers (PowerPC and OS/2 WARP are manufactured by the IBM Corporation). In addition, the victim host 30 runs zero or more applications 50, and zero or more personality servers 48 (i.e., provides functions of operating systems). Any combination of personality servers 48 and applications 50 can be the debug target.

The victim host 30 employs special servers called the RIP 42 (Remote IProbe) and the IS 44 (Instrumentation Server). The RIP 42 performs the communication between the debug host 10 and the IS 44. The IS 44 decodes and executes the debug commands that originated from remote IPMD back end 34. The commands are executed by the IS 44 with IBM Microkernel 40 calls in the preferred embodiment and in the case of a target application 50 some loader information services from a given personality. The flow on the victim host 30 involves the debug packet commands that enter the communication adapter 22 (FIG. 1) from the network adapter. These commands pass through a User-Level Device Driver (ULDD) 38 to the RIP 42. The RIP 42 extracts the debug commands from the network packets and send them to the IS 44 as microkernel inter-processor communication (IPC) calls. The IS 44 decodes the commands and carries out the action using IBM's MicroKernel 40 services. When the command is completed the IS 44 sends a response and may enqueue debug events to the IPMD back end 34 on the debug host 10. The personality neutral server 46 (PNS) contains common services required by the system including device drivers.

Figure 3:
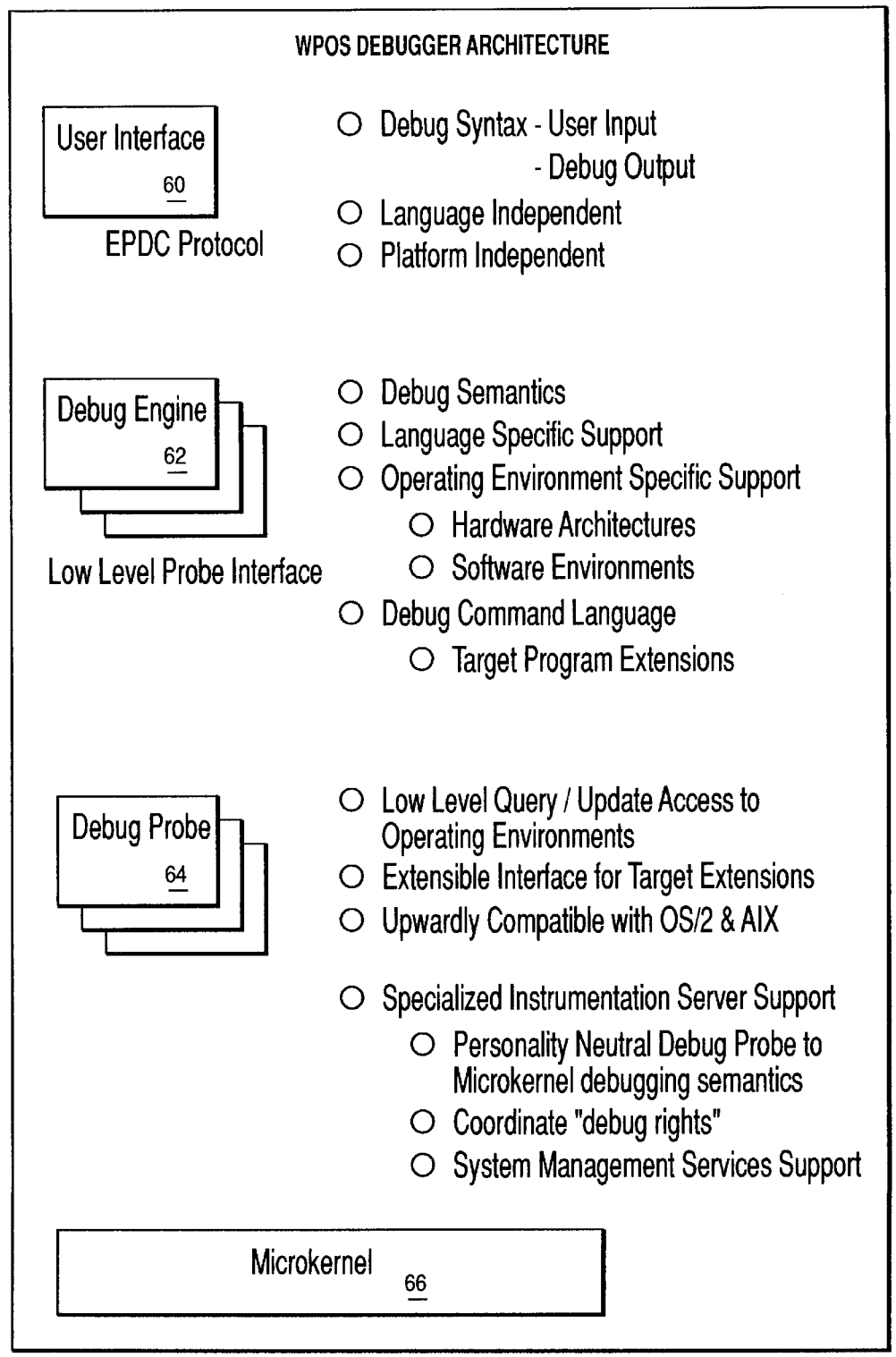
FIG. 3 is a representation of the basic components of the application debugger.

Turning now to FIG. 3, the basic components of the personality-neutral application debugger will be discussed in further detail. As shown in FIG. 3, the User Interface 60 supports user input, either graphical point and shoot (GUI) or ASCII character strings. In addition, the user interface receives debug output in graphical or ASCII character strings. The user interface 60 is independent of the platform and operating environments where the "target" applications being debugged are executing. The user interface 60 is also independent of the language in which the target applications have been written. The user interface 60 provides source level views of the "target" applications and access to all program variables, storage, registers, stacks, IPC events, based on the functional capabilities of the active debug Engine and compiler supplied debug information. The user interface 60 supports both GUIs, like IPMD, and line mode debuggers.

FIG. 3 also shows a debug engine 62 of the preferred embodiment which provides all the debug functions the user can request via the User interface 60. The primary interface is a set of request/reply messages related to the supported debug functions or specific data requirements of the user interface 60. The debug engine 62 interprets the debug requests within the semantics of a specific operating environments, a set of support services required from a program to execute in a computer system. Each operating environment is considered to have two dimensions. The hardware dimension in the preferred embodiment is one of the well-known platforms manufactured by the INTEL corporation (80486, Pentium) or the IBM Corporation (PowerPC). Hardware-unique code is embedded in single source files using compile-time switches. One skilled in the art will appreciate that single source files allow for different environment so that compilers may be instructed to ignore certain code during compile-time. For example, a compiler may be instructed to skip the compilation of Intel-specific code when a PowerPC environment is the intended target. The software dimensions consist of the IBM Microkernel supporting all PNS/Common Service Platform (CSP) servers running as microkernel tasks intended primarily for servers independent of a dominant personality. The invention is capable of debugging "higher" level application programs. Each server runs as a microkernel task and can be considered a separate software environment. Personality neutral applications/servers are assumed to be debugged within the semantics of the "launching" personality since the program runs within that personality's program model. Software operating environment unique code is modularized within the general structure of the debug engine 62 with separate source files for each operating environment, portable across hardware architectures. The debug engine 62 provides programming language-specific expression evaluation, including read/write access to simple variables and complex expressions, using compiler supplied debug information. The debug engine 62 also provides a command processor to parse and process ASCII debug commands. The command language is operating environment independent with support for "target" program-specific extensions, where server specific commands will be supported. The debug engine 62 subcomponent architecture supports multiprocessor (parallel) debug capability. The support is provided via a specialized version of the sequential multi-thread support required for each software operating environment.

The debug probe 64 exists for each dominant personality server and the IBM microkernel (PNS/CPS) layer and provides low level query/update functions within the semantics of the supported personality. The primary interface is a basic set of request/reply messages extensible for any registered program-specific functions required to debug or trace "target" programs. The debug probe 64 is used by other program analysis tools such as program visualizers (i.e., useful for plugging in different front ends) profilers and system management tools. The debug probe 64 can provide a list of available "target" applications under control of the supported containing personality to which the user may request attachment. As part of the initialization process, the debug probe 64 request debug rights from the Instrumentation Server (not shown) once the user has identified the application/program to be debugged. The debug probe 64 also provides the following general functions:

a) Connect support including Load/Attach functions
b) General status queries
c) Storage Reads/Writes
d) Register Reads/Writes
f) Exception Handling
g) Breakpoint Setting/Clearing
h) Execution control
i) Personality-specific queries With reference again to FIG. 3, the microkernel 40 for the preferred embodiment is manufactured by the IBM Corporation. A discussion of the microkernel 40 may be found in the patent application entitled, "System for Multiple Co-Existing Operating System Personalities on a Microkernel", having an attorney docket number AT9-93-026 and application Ser. No. 08/023,666, which is incorporated herein by reference.

Figure 4:
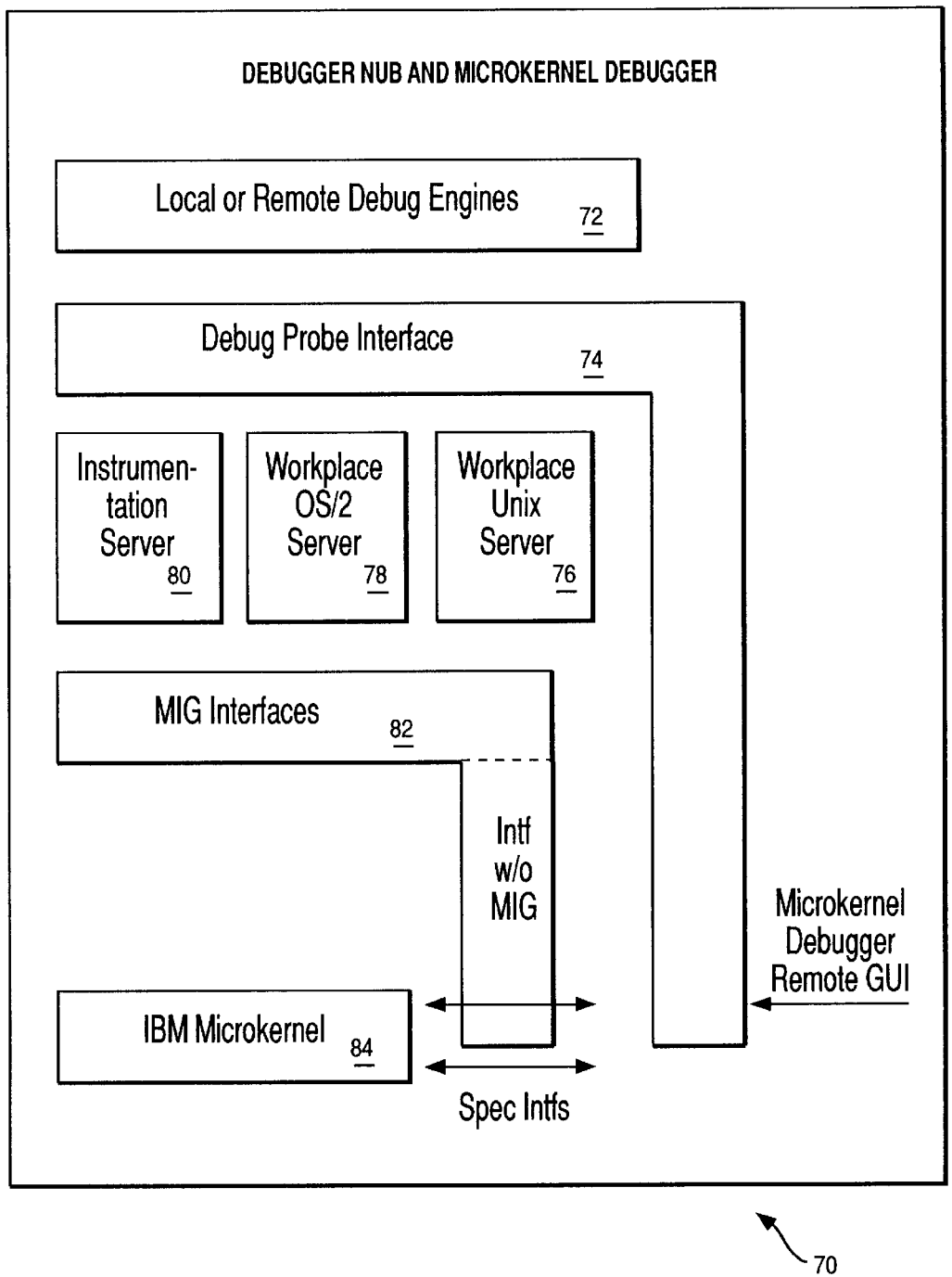
FIG. 4 is a block diagram representation of the component layers of the application debugger.

Turning now to FIG. 4, the layers of the application debugger are shown. The outer most layer of the application debugger is the local or remote debug engine 72. The debug probe interface 74 is shown separating the local or remote debug engine 72 and the instrumentation server 80, workplace OS/2 Server 78 and Workplace Unix Server 76. The instrumentation server 80 coordinates debug rights to microkernel 84 tasks between multiple debug engines and supports system management functions such as event tracing and counting. The primary interface to the Instrumentation Server 80 (IS) is a set of request/reply messages supporting these functions. The IS 80 also contains the routines running in each debug engine with a different address space for each debug engine. The IS 80 provides debug probe extensions for IS 80 specific functions. In the preferred embodiment, the IS 80 supports two flavors of the IBM MicroKernel—INTEL AND PowerPC. The IS 80 specific functions include:

Query access to the Master Server including translation of user specified names to "Mach names."

The mach names are generated by the root name server which contains resources/ports for identifying these items to the operating system.

Coordinates debug access to user level tasks, including control of debug rights between operating environments servers for specific microkernel tasks, such that multiple debug probes are not attached to a single task. The personality probe manages the microkernel tasks used by the personality to implement that personality's program.

Maintain a list of servers active for specific debug sessions so that the debug engine 72 can know which servers to step into or step over.

Queries a list of active servers that have loaders so that the debug engine 72 can ask for services form these loaders; i.e., launch an application, etc.

Figure 5:
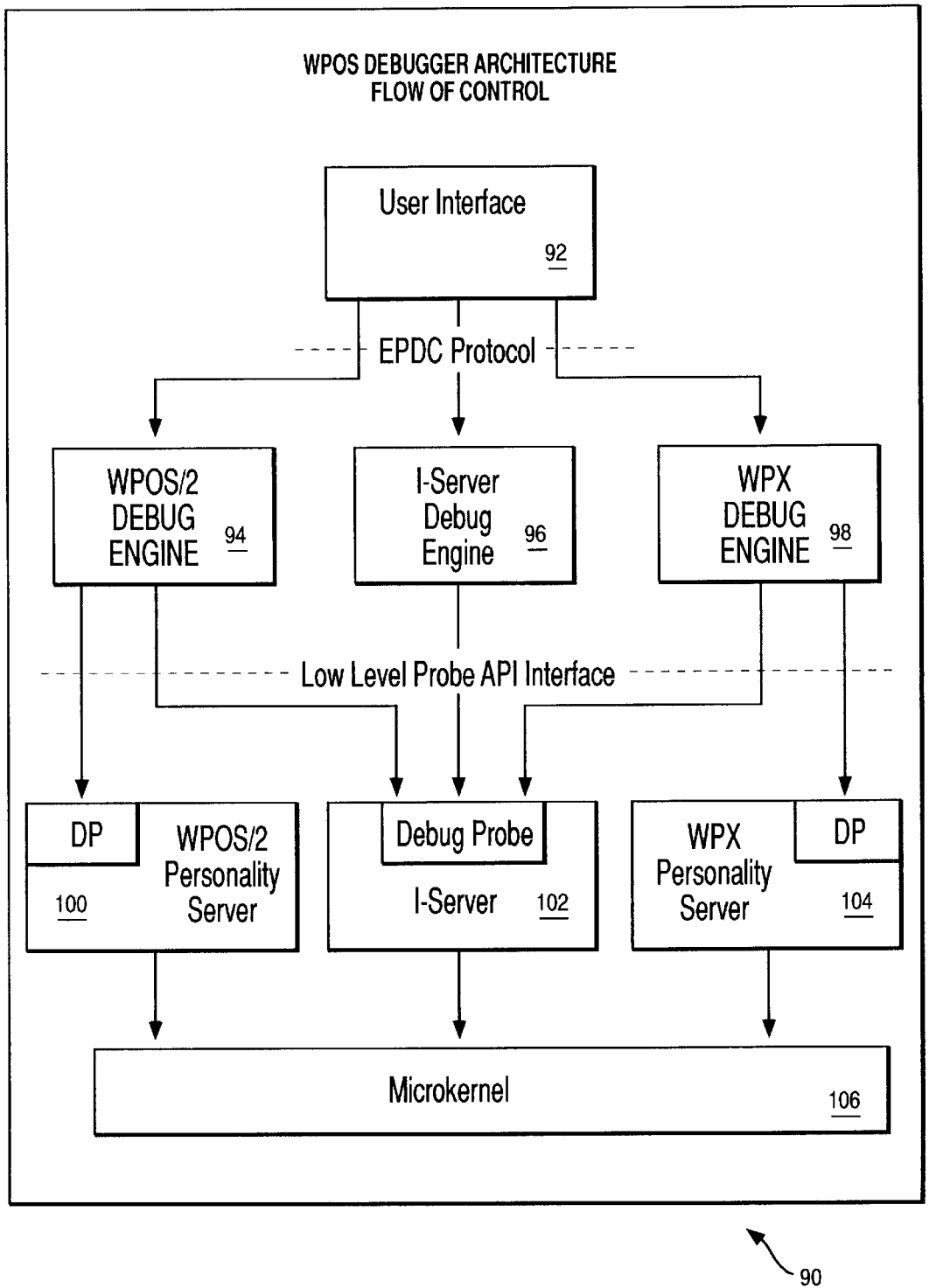
FIG. 5 is a flow of control for the application debugger.

Turning now to FIG. 5, there is shown a flow diagram illustrating the basic flow of control between the application debugger levels. For any user debug request, the User Interface 60 sends a request to one of the debug engines 94, 96, 98 which in turn sends one or more requests to one of the debug probes 95, 97, 99. The debug probes 95, 97,99 use personality server functions to complete the requested function or to send one or more messages to the IBM Microkernel 40 to complete the requested debug function. If common, personality neutral requests are identified that can be satisfied by the IS 102 debug probe. Each request receives the required reply all the way back to the User Interface 60. The IS 102 and each personality server execute as unique microkernel tasks. The User Interface 60 and debug engines 94, 96, 98 execute (i.e., one at a time) in a single task, when they are executing on the same system. The interface between the User Interface 60 and the debug engine 94, 96, 98 allows each component to execute on separate remote systems. The interface to the debug probes, like the interface to the IBM Microkernel, allows the containing servers to execute on the same or a different system from where either the debug engine or the IBM microkernel 40 are executing. The expected start up scenario is:

STEP 1: The user identifies the desired operating environment—"Local" or a "remote" network node identifier, and the type of program to be debugged (i.e., dominant personality desired).

STEP 2: The user interface 60 establishes communications with one of the debug engines 94, 96, 98 on the requested system.

STEP 3: The user interface/debug engines queries the appropriate operating environment to present to the user a list of "programs" which may be debugged if the user has not supplied a name.

STEP 4: The debug engine requests "ATTACHMENT" to the requested program's process or microkernel task from the appropriate debug probe.

STEP 5: The debug probe obtains debug rights to the microkernel task associated with the user selected program/process from the personality server containing the debug probe.

Figure 6:
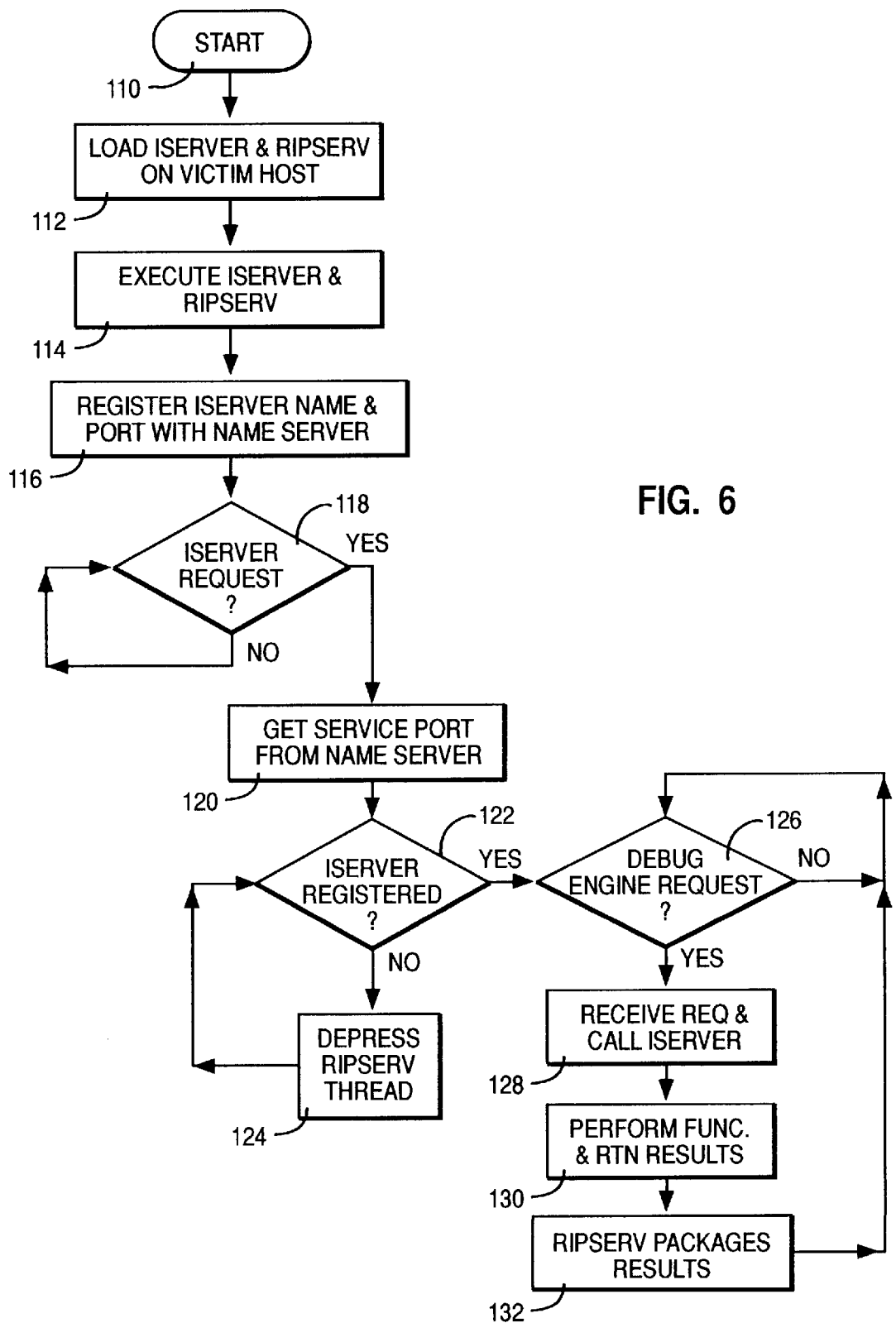
FIG. 6 is a flow diagram of Debug/Victim host operations of the present invention.

Turning now to FIG. 6, a flow diagram containing additional detail is shown for start-up operation on the victim host 30 and debug host 10 as shown in FIG. 2. One skilled in the art will appreciate that the debug host and victim host may be in the same machine. The procedure starts at block 110 and proceeds to block 112 where the User loads the instrumentation server and RIP server in the boot.cfg file on the victim host. One skilled in the art will appreciate that the boot.cfg file contains configuration parameters which are loaded when the file is executed. At block 114 the instrumentation server and RIP server starts execution. It will be appreciated by one skilled in the art that execution may began in any order. The procedure continues at block 116 where the instrumentation server registers its name and server port with the name server. After registering its name and service port the instrumentation server checks for requests at block 118. If no requests are detected, the procedure loops until requests are received. At block 120, the RIP server queries the name server to get the instrumentation server's port. If the RIP server finds the instrumentation server is not registered, at block 124 the RIP server depresses the RIP server thread priority for several time slices and enters a loop awaiting instrumentation server registration. One skilled in the art will appreciate that the RIP server will terminate the loop sequence after checking a predetermined number of times for instrumentation server registration. Returning to block 128, when the user inputs a command to the debug engine, the debug engine sends a request to the RIP server via serial, ethernet, or token ring communication with a pitch-catch, TCP, or UDP protocol. At block 128, the RIP server receives the request and calls the corresponding instrumentation server function via an IPC. The instrumentation server then performs the functions and returns the result as shown in block 130. At block 132, the RIP server packages the results and returns it to the debug engine.

Figure 7:
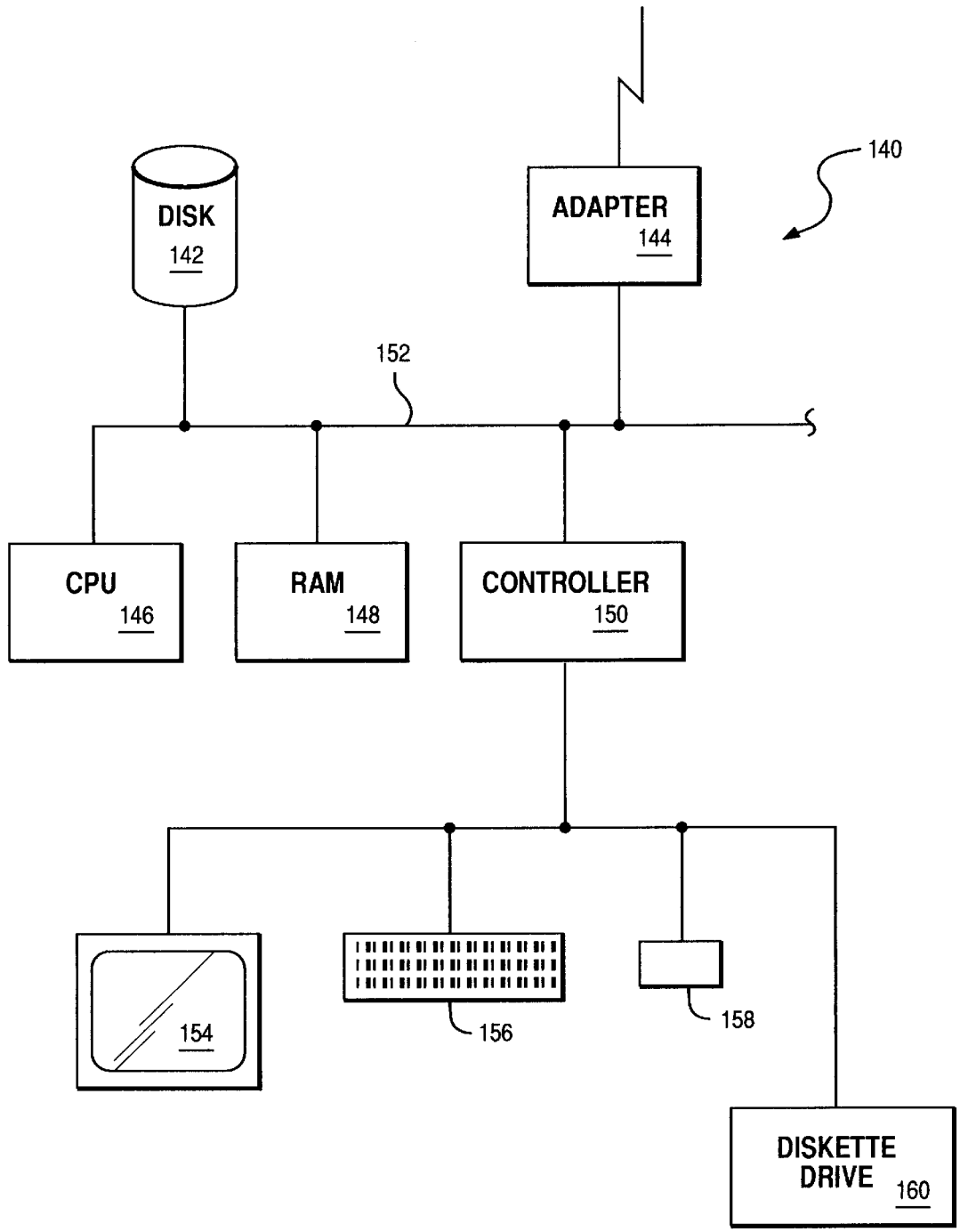
FIG. 7 is a block diagram of a computer system capable of implementing the preferred embodiment of the present invention.

Turning to FIG. 7, the generalized computer system 140 shown is embodied in a number of commercially available systems such as the IBM PS/2 computer and the IBM RISC System/6000 computer. (PS/2 and RISC System/6000 are trademarks of the IBM Corporation). The current operating system support of the present invention (e.g., Host machines can be either Intel MicroProcessor/Operating System 2 2.X or RISC System/6000 with AIX Operating System) is designed to function on either of the aforementioned systems or any new hardware architecture adapted to run the microkernel. With reference to FIG. 7, the basic components include one or more processing units or CPUs 146, hard disk or other permanent storage 142, random access memory 148, network communications support via an adapter 144, and input/output support to display device 154, keyboard 156, pointing device 158 and floppy diskette drive 160 through I/O controller 150. One skilled in the art will appreciate that a computer program product containing computer program logic recorded thereon may be stored on a computer readable medium (e.g., floppy diskette) and inputted to the computer system using the floppy diskette drive 160. These components communicate over a system bus 152.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method of debugging an application under only a microkernel, comprising:

provicing a debug host having network means and user input means, connecting a victim host to said debug host by said network means, said victim host containing said application under debug and said microkernel, receiving debug commands from a user through said user input means and sending said debug commands to said application through a debug probe on said victim host, wherein said debug probe is granted root authority, setting said application into debug mode by said debug probe having root authority from a list containing said application and a plurality of applications constructed by polling said microkernel; and executing said debug commands against said application using system calls from said microkernel.

2. The method of claim 1 wherein said providing step includes the step of providing an operating system on said debug host.

3. The method of claim 1 wherein said sending step includes the step of intercepting user debug commands by said microkernel on said victim host.

4. The method of claim 3 wherein said microkernel passes user debug commands to said application under debug through a user-level device driver.

5. The method of claim 1 wherein said step of executing said debug commands against said application under debug includes accessing a personality neutral server on said victim host.

6. The method of claim 1 wherein the step of executing said debug commands against said application under debug includes providing an instrumentation server on said victim host having a debug probe for said application under debug on said victim host.

7. The method of claim 6 wherein said step of executing said debug commands includes the step of loading said instrumentation server during a microkernel boot.

8. The method of claim 6 wherein said step of executing said debug commands includes granting root authority to said instrumentation server during said microkernel boot.

9. An apparatus for debugging an application under only a microkernel on a personality neutral debugger, comprising:

means for providing a debug host having network means and user input means, means for connecting a victim host to said debug host by said network means, said victim host containing said application under debug and said microkernel, means for sending debug commands by a user on said user input means to said application through a debug probe on said victim host wherein said debug probe is granted root authority;

means for setting said application into debug mode by said debug probe having debug authority from a list containing said application and a plurality of applications constructed by polling said microkernel; and means for executing said debug commands against said application using system calls by said microkernel.

10. The apparatus of claim 9 wherein said means for providing a debug host includes means for providing an operating system on said debug host.

11. The apparatus of claim 9 wherein said means for sending includes means for intercepting user debug commands by said microkernel on said victim host.

12. The apparatus of claim 9 wherein said microkernel passes user debug commands to said application under debug through a user-level device driver.

13. The apparatus of claim 9 wherein said means for executing said debug commands against said application under debug includes means for accessing a personality neutral server on said victim host.

14. The apparatus of claim 9 wherein the means for executing said debug commands against said application under debug includes means for providing an instrumentation server on said victim host having a debug probe for said application under debug on said victim host.

15. The apparatus of claim 9 wherein said means of executing said debug commands includes means for loading said instrumentation server during a microkernel boot.

16. The apparatus of claim 9 wherein said means of executing said debug commands includes means for granting root authority to said instrumentation server during said microkernel boot.

17. A computer program product having a computer readable medium having computer program logic recorded thereon for concurrently executing multiple operating systems, said computer program comprising:

means for connecting a victim host to a debug host by network means, said victim host containing said application under debug and a microkernel, means for sending debug commands by a user on said user input means to said application through a debug probe on said victim host wherein said debug probe is granted root authority;

means for setting said application into debug mode by said debug probe having root authority from a list containing said application and a plurality of applications constructed by polling said microkernel; and means for executing said debug commands against said application using system calls from said microkernel.

18. The computer program of claim 17 wherein said means for providing a debug host includes means for providing an operating system on said debug host.

19. The computer program of claim 17 wherein said means for sending includes means for intercepting user debug commands by said microkernel on said victim host.

20. The computer program claim 17 wherein said microkernel passes user debug commands to said application under debug through a user-level device driver.

21. The computer program of claim 17 wherein said means for executing said debug commands against said application under debug includes means for accessing a personality neutral server on said victim host.

22. The computer program of claim 17 wherein the means for executing said debug commands against said application under debug includes means for providing an instrumentation server on said victim host having a debug probe for said application under debug on said victim host.

23. The computer program of claim 17 wherein said means for executing said debug commands includes means of loading said instrumentation server during a microkernel boot.

24. The computer program of claim 17 wherein said means for executing said debug commands includes means of granting root authority to said instrumentation server during said microkernel boot.

* * * * *